US011235424B2

(12) United States Patent
Szini et al.

(10) Patent No.: US 11,235,424 B2
(45) Date of Patent: Feb. 1, 2022

(54) ANTENNA STRUCTURE AND METHODS FOR CHANGING AN INTRINSIC PROPERTY OF A SUBSTRATE MATERIAL OF THE ANTENNA STRUCTURE (71) Applicant: Motorola Mobility LLC, Chicago, IL (US)

(72) Inventors: Istvan J. Szini, Grayslake, IL (US); Aiman Shibli, Skokie, IL (US)

(73) Assignee: Motorola Mobility LLC, Chicago, IL (US)

( * ) Notice: Subject to any disclaimer, the term of this patent is extended or adjusted under 35 U.S.C. 154(b) by 574 days.

(21) Appl. No.: 16/290,491

(22) Filed: Mar. 1, 2019

(65) Prior Publication Data
US 2019/0193206 A1 Jun. 27, 2019

Related U.S. Application Data (62) Division of application No. 15/044,214, filed on Feb. 16, 2016, now Pat. No. 10,259,078.

(60) Provisional application No. 62/186,680, filed on Jun. 30, 2015.

(51) Int. Cl.
H01Q 1/38 (2006.01)
B23K 26/362 (2014.01)
G05B 19/4097 (2006.01)
B23K 26/361 (2014.01)
H01Q 9/42 (2006.01)

(52) U.S. Cl.
CPC .......... B23K 26/362 (2013.01); B23K 26/361 (2015.10); G05B 19/4097 (2013.01); H01Q 1/38 (2013.01); G05B 2219/40066 (2013.01); G05B 2219/45163 (2013.01); H01Q 9/42 (2013.01)

(58) Field of Classification Search
CPC .. B23K 26/362; B23K 26/361; B23K 26/402; G05B 2219/40066; G05B 2219/45163
See application file for complete search history.

(56) References Cited

U.S. PATENT DOCUMENTS

| | | | | |
|---|---|---|---|---|
| 5,943,580 A | * | 8/1999 | Ramakrishnan | H01G 4/10 438/381 |
| 7,218,280 B2 | | 5/2007 | Annamaa et al. | |
| 2003/0192865 A1 | | 10/2003 | Cole et al. | |
| 2004/0026690 A1 | * | 2/2004 | Bernds | B82Y 10/00 257/40 |
| 2006/0275705 A1 | | 12/2006 | Dorogy et al. | |
| 2007/0130754 A1 | * | 6/2007 | Fein | G06K 19/07749 29/600 |
| 2008/0299408 A1 | * | 12/2008 | Guo | B23K 26/0006 428/573 |

(Continued)

OTHER PUBLICATIONS

Dylan F. Williams, et al., "Adjustable Tuning for Planar Millimeter-Wave Circuits", International Journal of Infrared and Millimeter Waves, vol. 7, No. 11, 1986, pp. 1729-17 46.

Primary Examiner — Geoffrey S Evans (57) ABSTRACT

Methods and systems for laser etching substrates to fine tune antennas for wireless communication are provided. A method includes laser etching an antenna element design into a substrate material. The antenna element design is for receiving conductive material to form an antenna structure. The method also includes laser etching a first area of the substrate material to change an intrinsic property of the substrate material in order to control an electrical characteristic of the antenna structure.

20 Claims, 8 Drawing Sheets (56) References Cited

U.S. PATENT DOCUMENTS

| | | |
|---|---|---|
| 2009/0101281 A1 | 4/2009 | Sacherer |
| 2011/0140987 A1* | 6/2011 | Ito .......................... H01Q 9/42 |
| | | 343/893 |
| 2013/0248236 A1 | 9/2013 | Mutnury et al. |
| 2014/0106085 A1* | 4/2014 | Cho ....................... H01Q 1/243 |
| | | 427/555 |
| 2014/0203982 A1 | 7/2014 | Seo et al. |
| 2014/0317909 A1 | 10/2014 | Virtanen |
| 2015/0165549 A1 | 6/2015 | Beutler et al. |

* cited by examiner

FIG. 8

ANTENNA STRUCTURE AND METHODS FOR CHANGING AN INTRINSIC PROPERTY OF A SUBSTRATE MATERIAL OF THE ANTENNA STRUCTURE

RELATED APPLICATIONS

The present application is related to and is a divisional of U.S. patent application Ser. No. 15/044,214, filed Feb. 16, 2016, which claims benefit under 35 U.S.C. § 119(e) from U.S. Provisional Patent Application Ser. No. 62/186,680, filed Jun. 30, 2015, titled "An Antenna Structure and Methods for Changing an Intrinsic Property of a Substrate Material of the Antenna Structure", which is commonly owned with this application by Motorola Mobility LLC, the entire contents of which are incorporated herein by reference.

FIELD OF THE DISCLOSURE

The present disclosure relates generally to antennas and more particularly to methods and an antenna structure for changing an intrinsic property of a substrate material using laser etching to control an electrical characteristic of an antenna structure.

BACKGROUND

A light amplification by stimulated emission of radiation ("LASER" (also referred to herein as a "laser")) device produces a very narrow and highly concentrated beam of light. Etching systems that include a laser are used to etch substrates for manufacturing antennas, for instance using a Laser Direct Structuring (LDS) antenna manufacturing technology. However, the antennas don't always operate as desired, which can require last minute adjustments to the final antenna design. In some cases such modifications are in reaction to changes in the antenna fabrication, geometry, and/or applied materials properties such as for an antenna support or cover.

Retuning an antenna structure near a product delivery deadline can require the redesign and production of hundreds of thousands of new parts. Alterations might create a situation where multi-band antenna band edges fail the expected radiation performance due to mismatch loss caused by antenna resonance shift. In addition, shipping deadlines can be compromised if any material or antenna structural change needs to take place.

BRIEF DESCRIPTION OF THE FIGURES

The accompanying figures, where like reference numerals refer to identical or functionally similar blocks throughout the separate views, form part of the specification and illustrate embodiments in accordance with the included claims.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to various embodiments described herein, the present disclosure provides methods and systems for changing an intrinsic property of a substrate material (also referred to herein as a substrate) using laser etching to control an electrical characteristic of an antenna structure (also referred to herein as an antenna). For example, controlled laser etching can be performed to change the relative permittivity, also commonly known as the dielectric constant, of the substrate etched, such that the change in relative permittivity is directly proportional to an operating parameter of the laser. One example of an operating parameter of the laser is the laser power. Knowing the current and electric field distribution for the antenna structure, a determination can be made which area of the antenna substrate to etch to tune or retune the antenna structure to within a tolerance of desired electrical characteristics for the antenna structure. Laser etching the substrate to change an intrinsic property of the substrate can enable, for instance, more accurate tuning of the antenna, additional freedom for antenna designers, and more certainty that the antenna structure will operate as designed.

An intrinsic or characteristic property, as used herein, is a property of or within a material that is inherent to the material and independent of the amount of material that is present. Intrinsic properties are dependent mainly on the chemical composition or structure of the material. Examples of intrinsic properties of a material include dielectric constant, density, color, texture, etc. For instance, a piece of material having a certain mass and physical dimensions will have the same intrinsic properties as another piece of the same material having a different mass and/or physical dimensions. This is in contrast to an extrinsic property of a material that is not inherent to the material and does depend on the amount of the property present such as mass, weight, length, volume, etc.

Electrical or performance properties of an antenna structure result, for instance, from current and electric field distribution associated with the antenna structure as it operates. Such properties include, for example, gain, radiation pattern, impedance, bandwidth, resonant frequency, and polarization.

Figure 1:
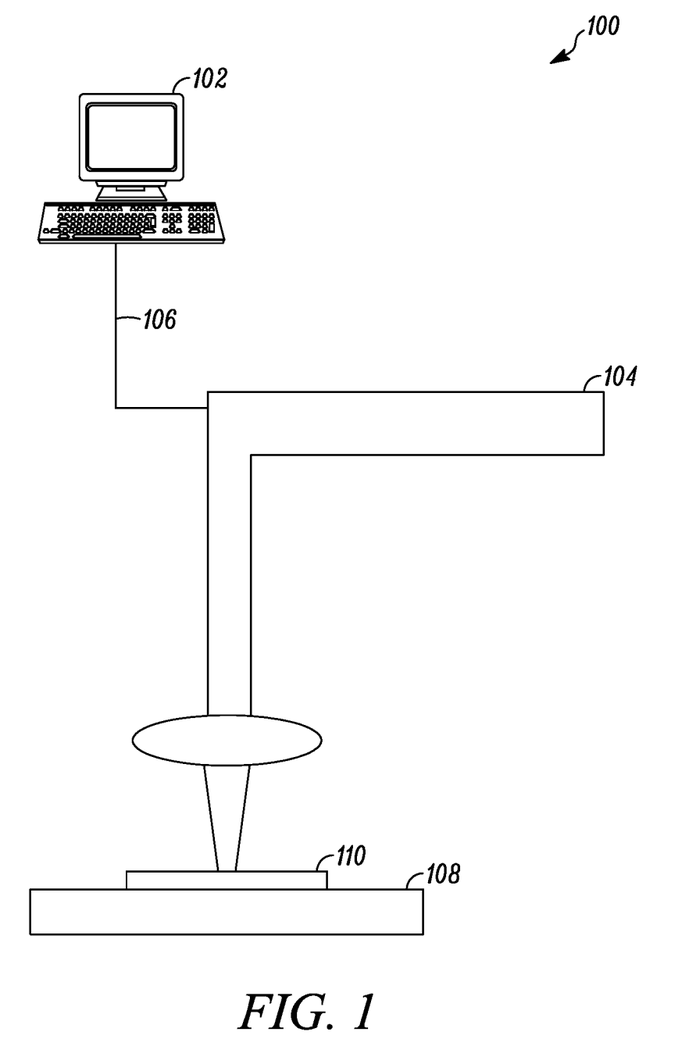
FIG. 1 shows an etching system configured for tuning an antenna by laser etching a substrate material of the antenna in accordance with some embodiments.

FIG. 1 shows an etching system 100, in accordance with some embodiments. The etching system 100 includes a computer system or computer 102 that communicates with and provides instructions to a laser-etching device 104. The laser-etching device 104 includes a platform 108 for a substrate material 110.

In general, in accordance an embodiment, the etching system 100 performs a method that includes laser etching an antenna element design into a substrate material, wherein the antenna element design is for receiving conductive material to form an antenna structure. This general method further includes laser etching a first area of the substrate material to change an intrinsic property of the substrate material in order to control an electrical characteristic of the antenna structure. Thus, according to the present teachings, the laser can be used to alter the substrate material in certain selected areas in order to alter an intrinsic property of the material only in those selected area in a controlled manner in order to control an electrical characteristic of the antenna structure to with an acceptable tolerance of desired electrical characteristics for the antenna structure.

For an example, the intrinsic property of the substrate material, which is changed by laser etching the first area, is dielectric constant, and the electrical characteristic of the antenna structure, which is controlled by laser etching the first area, is resonant frequency. However, the present teachings might be used to change other intrinsic properties such as one or more listed above in order to impact or control resonant frequency or one or more other electrical properties of the antenna structure.

For a particular embodiment, laser etching the first area of the substrate material includes laser etching at least a first segment of the first area to decrease the dielectric constant from an original dielectric constant of the substrate material to a first dielectric constant. The original dielectric constant is also referred to herein as the intrinsic dielectric constant. For another embodiment, laser etching the first area of the substrate material further includes laser etching a second segment of the first area to decrease the dielectric constant from the original dielectric constant of the substrate material to a second dielectric constant that is different than the first dielectric constant.

For yet another embodiment, the antenna structure includes an array of multiple antenna elements. For this embodiment, the method performed by the system 100 can include depositing the conductive material within the antenna element design such that a first portion of the conductive material is laid adjacent to the first segment of the substrate material having the first dielectric constant to form a first antenna element, of the array of antenna elements, capable of transferring electromagnetic waves. Moreover, a second portion of the conductive material is laid adjacent to the second segment of the substrate material having the second dielectric constant to form a second antenna element, of the array of antenna elements, which is separately capable, from the first antenna element, of transferring electromagnetic waves.

Figure 3:
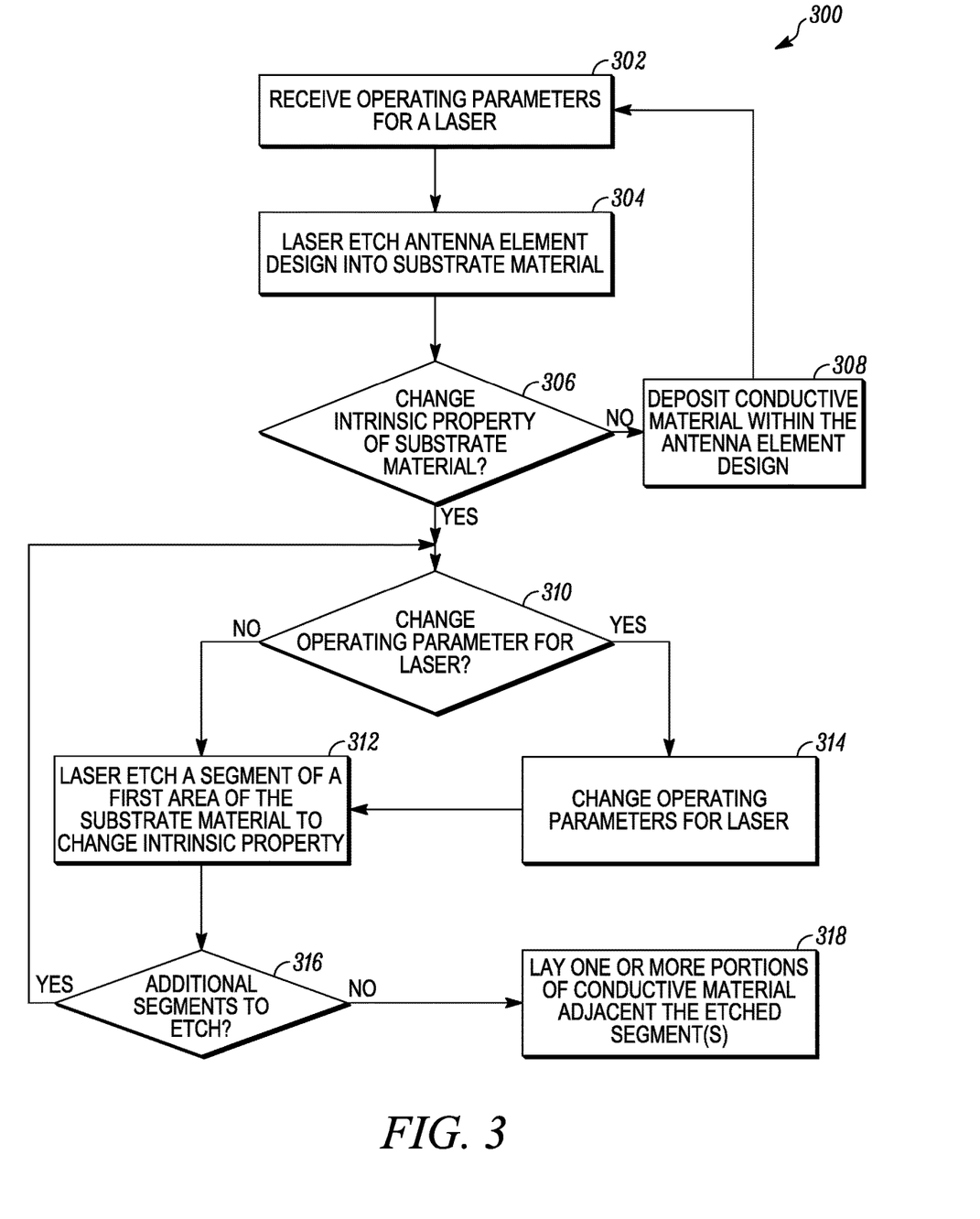
FIG. 3 shows a logical flow diagram illustrating a method for tuning an antenna by laser etching a substrate material of the antenna in accordance with some embodiments.

For at least some embodiments, for instance described by reference to FIG. 5, the method performed by the system 100 can include varying an operating parameter of a laser while laser etching to change the intrinsic property of the substrate material. Example operating parameters of the laser that can varied include one or a combination of power level, frequency, speed, or distance of the laser to the substrate material. For a particular embodiment, laser etching the antenna element design and laser etching the first area of the substrate material include operating a laser using a same set of operating parameters. FIG. 3, described below, illustrates a more detailed method in accordance with the present teachings that can be performed by the etching system 100.

Figure 2:
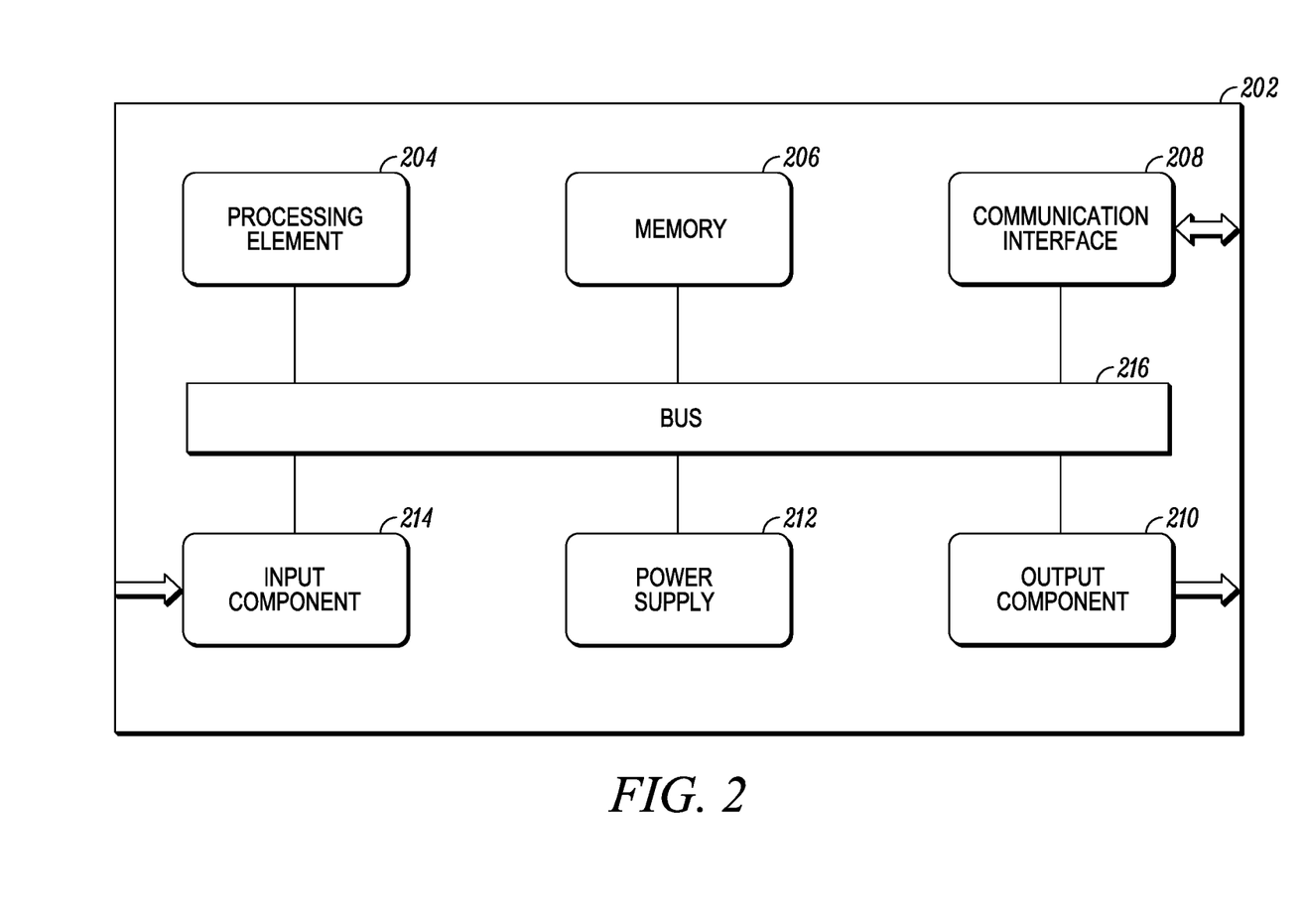
FIG. 2 illustrates a block diagram of a computer configured for tuning an antenna by laser etching a substrate material of the antenna in accordance with some embodiments.

FIG. 2 illustrates a block diagram of a computer system 202, such as the computer 102, in accordance with some embodiments of the present teachings. Included within the computer 202 is a processing element 204, memory 206, a communication interface 208, an input component 214, an output component 210, and a power supply 212, which are all operationally interconnected by a bus 216. A limited number of device components 204, 206, 208, 210, 212, 214, and 216 are shown in the computer 202 for ease of illustration. Other embodiments may include a lesser or greater number of components in a computer. Moreover, other components needed for a commercial embodiment of a computer that incorporates the components 204, 206, 208, 210, 212, 214, 216 shown in the computer 202 are omitted from FIG. 2 for clarity in describing the enclosed embodiments.

In general, the processing element 204 is configured with functionality in accordance with embodiments of the present disclosure as described herein with respect to the remaining figures. "Configured," "adapted," "operative," or "capable," as used herein, means that indicated components are implemented using one or more hardware elements, such as one or more operatively coupled processing cores, memory elements, and interfaces, which may or may not be programmed with software and/or firmware, as the means for the indicated components to implement their desired functionality. Such functionality is supported by the other hardware shown in FIG. 2, including the device components 206, 208, 210, 212, and 214, which are all operatively interconnected with the processing element 204 by the bus 216.

The processing element 204, for instance, includes arithmetic logic and control circuitry necessary to perform the digital processing, in whole or in part, for the computer 202 to control the tuning of an antenna by laser etching the substrate in accordance with described embodiments for the present teachings. For one embodiment, the processing element 204 represents a primary microprocessor, also referred to as a central processing unit (CPU), of the computer 202. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components of the computer 202 to perform at least some of their intended functionality.

The memory 206 provides storage of electronic data used by the processing element 204 in performing its functionality. For example, the processing element 204 can use the memory 206 to store files associated with the operating parameters of the laser-etching device 104. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store files associated with the operating parameters of the laser-etching device 104.

The communication interface 208 allows for communication between the computer 202 and other electronic devices, such as the laser etching device 104 or file servers, configured to support the computer 202 in performing its described functionality. For one embodiment, the communication interface 208 uses a wireless local area network (WLAN) transceiver that allows the computer 202 to access the Internet using standards such as Wi-Fi. The WLAN transceiver allows the computer 202 to send and receive radio signals to and from similarly equipped electronic devices using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

For additional embodiments, the communication interface 208 uses hard-wired, rather than wireless, connections to a network infrastructure that allows the computer 202 to communicate electronically with other devices. For example, the communication interface 208 includes a socket that accepts an RJ45 modular connector that allows the computer 202 to be connected directly to a network router by category-5 or category-6 Ethernet patch cable. The communication interface 208 can also use a cable modem or a digital subscriber line (DSL) to connect with other electronic devices through the Internet via an Internet service provider (ISP) or other connectors and cable to directly connect to the laser-etching device 104.

The input component 214 and the output component 210 represent user-interface components of the computer 202 configured to allow a person to use, program, or otherwise interact with the computer 202. Different computers for different embodiments include different combinations of input 214 and output 210 components. A touchscreen, for example, functions both as an output component and an input component for some embodiments. Peripheral devices for other embodiments, such as keyboards, mice, and touchpads, represent input components that enable a user to program a PC or server to control the laser etching for purposes of implementing one or more of the present embodiments. A speaker is an output component 210 that for some embodiments allows a computer to verbally prompt a user for input. Particular embodiments include an acoustic transducer, such as a microphone, as an input component that converts received acoustic signals into electronic signals.

The power supply 212 represents a power source that supplies electric power to the device components 204, 206, 208, 210, 214, 216, as needed, during the course of their normal operation. The power is supplied to meet the individual voltage and load requirements of the device components 204, 206, 208, 210, 214, 216 that draw electric current. For some embodiments, the power supply 212 is a wired power supply that provides direct current from alternating current using a full- or half-wave rectifier. For other embodiments, the power supply 212 is a battery that powers up and runs a mobile device. For a particular embodiment, the battery 212 is a rechargeable power source. A rechargeable power source for a device is configured to be temporarily connected to another power source external to the device to restore a charge of the rechargeable power source when it is depleted or less than fully charged. In another embodiment, the battery is simply replaced when it no longer holds sufficient charge.

A general method that can be performed by the computer 202 includes determining a first magnitude of an electrical characteristic of an antenna structure, wherein the first magnitude is associated with forming an antenna element design into a substrate material using a laser operating using a first set of parameters. The method also includes determining a difference between the first magnitude and a desired magnitude of the electrical characteristic of the antenna structure. The method further includes determining a second set of parameters for operating the laser to control an intrinsic property of the substrate material at a first area of the substrate material to tune the electrical characteristic of the antenna structure to a second magnitude that is closer than the first magnitude to the desired magnitude.

Figure 4:
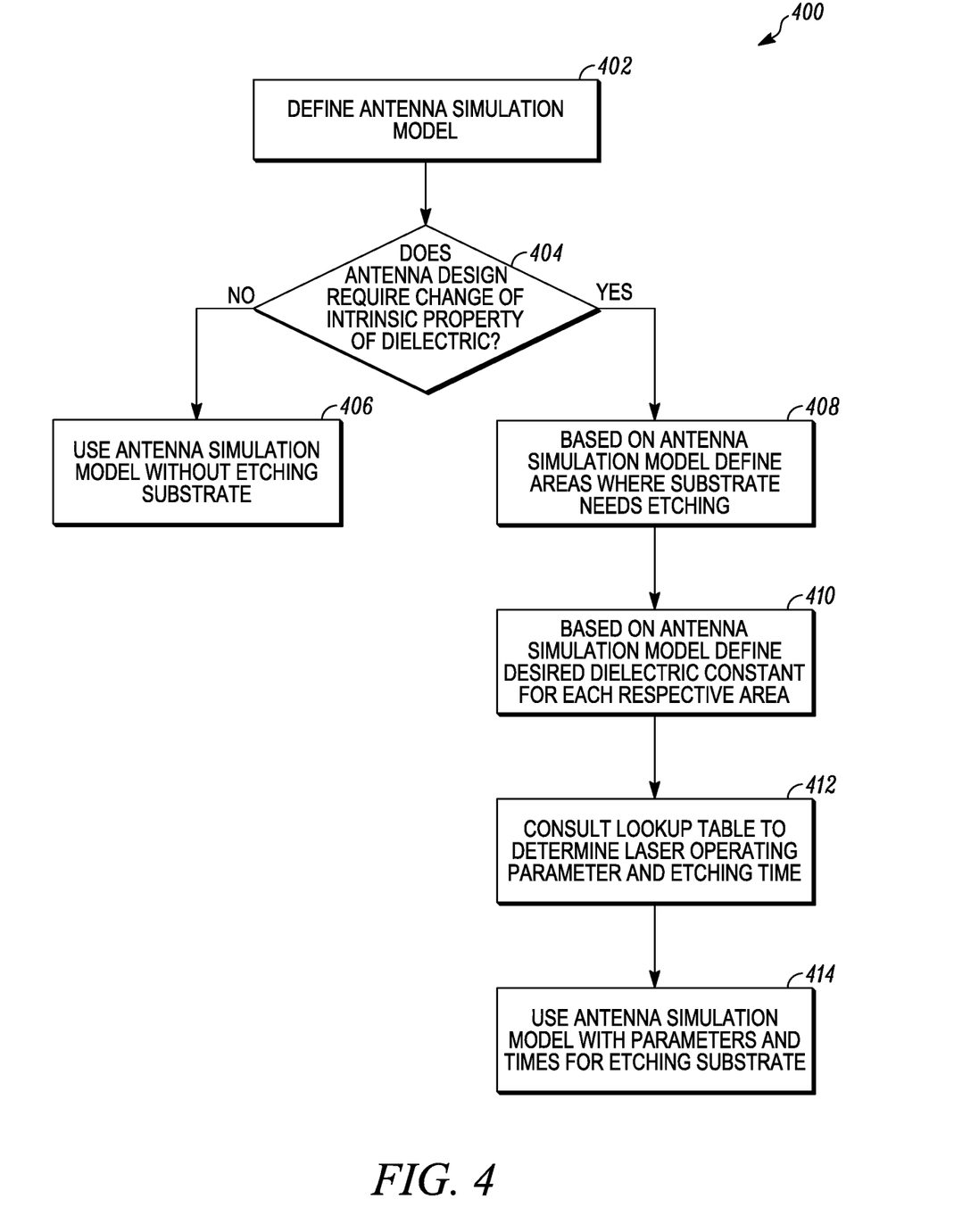
FIG. 4 shows a logical flow diagram illustrating another method for tuning an antenna by laser etching a substrate material of the antenna in accordance with some embodiments.

For a particular embodiment of method performed by the computer 202, the intrinsic property of the substrate material that is controlled is a dielectric constant, and the characteristic of the antenna structure that is tuned is resonant frequency. For another embodiment, the method performed by the computer 202 further includes determining a third set of parameters for operating the laser to control the dielectric constant of the substrate material at the first area of the substrate material to tune the resonant frequency of the antenna structure. Accordingly, the second set of parameters is used to decrease the dielectric constant of the substrate material to a first dielectric constant value that supports a first antenna element, and the third set of parameters is used to decrease the dielectric constant of the substrate material to a second dielectric constant value that supports a second antenna element. For yet another embodiment, the first and second sets of parameters for operating the laser are different and include at least one of different power levels, different frequencies, different speeds, or different distances of the laser to the substrate material. FIG. 4, described below, illustrates a more detailed method in accordance with the present teachings that can be performed by the computer 202.

FIG. 3 shows a logical flow diagram illustrating a method 300 of tuning an antenna by laser etching the substrate in accordance with some embodiments. For example, the method 300 receives operating parameters at block 302 and laser etches an antenna element design into the substrate at block 304. The antenna element design defines an area within which a conductive material (such as a metal) will be laid. At block 306, a determination is made whether an intrinsic property of the substrate for the antenna structure needs to be changed to correct an undesired shift in an electrical characteristic of the antenna structure, such as for example, resonance. Antenna performance can be recovered by, for instance, reducing the dielectric constant on specific areas of the substrate, such as areas of the substrate associated with a high e-field part of the antenna.

If the antenna structure electrical characteristics are met then there is no need to change the intrinsic properties of the substrate and the method 300 deposits, at block 308, the conductive material in the area of the substrate that has been laser etched for the antenna element design. However, if a change needs to be made to the intrinsic properties of the substrate material so that the antenna structure electrical characteristics are met the method 300 determines, at block 310, whether to change the operating parameter(s) for the laser. If it is determined at block 310 that the operating parameters of the laser need to be changed then the method 300 proceeds towards block 314 where the operating parameters of the laser are changed. Examples of the operating parameters are the power level of the laser, frequency, speed, and distance of the laser to the substrate material.

Varying any of the operating parameters changes the intensity of the laser. For example, increasing the speed of the laser reduces the amount of time that laser is etching a given area of the substrate. As another example, increasing the distance of the laser from the substrate also reduces the intensity of the laser. Any combination of operating parameters can be used to obtain the desired effect. The operating parameters can be in a look-up table stored in memory 206 in the computer 102. An example of a look-up table is depicted in FIG. 5.

After the operating parameters are changed, at block 314, or when no changes to the operating parameters of the laser are needed, the method 300 proceeds towards block 312. At block 312, a segment of a first area of the substrate material is laser etched to change an intrinsic property of the material. In an embodiment, the intrinsic property is the dielectric constant of the material. The first area of the substrate etched is an area not containing the metal conductor for the antenna or laser etched for the antenna design. For one embodiment, the first area etched is on the same side as the metal conductor. In another embodiment, the substrate is laser etched on the side opposite the metal conductor.

In 5G devices the antennas are typically a couple millimeters in length. While the frequency of interest is a constant, fine-tune/tuning the dielectric constant in certain areas of the antenna using etching is more pronounced because of the relatively short length of the antenna when compared to the length of the antennas in other technologies, such as for example, in 4G. For example, tuning a ¼ mm or ¹⁄₁₀ mm antenna by laser etching has a greater impact on a millimeter wave antenna that the longer antennas used in 4G.

After the first segment is laser etched, the method 300 proceeds towards block 316. If it is determined that there are additional segments that need to be laser etched the method proceeds towards block 310. The function performed at block 310 and subsequent blocks operate as described above and are not repeated for brevity. When it is determined at block 316 that there are no more segments that need etching, the method 300 proceeds towards block 318. At block 318 one or more portions of conductive material are laid adjacent to the etched segment(s). Thus, for this embodiment, the first area is laser etched before depositing the conductive material. For an additional or alternative embodiment, the first area is laser etched after depositing the conductive material.

FIG. 4 shows a logical flow diagram illustrating a method 400 of designing an antenna that will be tuned by laser etching the substrate in accordance with some embodiments. In one embodiment, method 400 is used by the computer 102 to simulate the different areas of different dielectric constants that are needed to tune the resonant frequency. The method 400 defines, at block 402, an antenna simulation model that provides an antenna design having specific operating parameters using data for a selected substrate material(s) 110 and selected conductor(s) material.

Knowing the characteristics/properties of the selected materials and the antenna design, the method 400 queries at block 404 whether the antenna design requires changes to the intrinsic property of the dielectric constant for the selected materials. For example if the substrate is made of a specific polymer having a known dielectric constant, such as a polymer sold under the trademark LEXAN 1414 (a product of Sabic Innovative Products in Aachen Germany), the simulation provides freedom to replace blocks of the Lexan with a material(s) having a different dielectric constant. The material underneath the antenna design can be manipulated. For example, one area of the substrate can have a dielectric constant of 2.4 next to a second area having a dielectric constant of 2.3 next to a third area having a dielectric constant having a dielectric constant of 2.4 back, etc.

If no change to the intrinsic properties of the dielectric is needed then the method 400 proceeds towards block 406 where the antenna simulation model that does not include etching of the substrate is saved for later use. In an embodiment, the antenna simulation model from block 406 is used on a substrate material.

If, at block 404, it is determined that the intrinsic properties of the dielectric constant of the substrate requires changing, the method 400 proceeds towards block 408. At block 408, the antenna simulation model from block 402 is used to define areas on the substrate material 110 that need etching for reception of a conductive material. Thereafter, the method 400 proceeds towards block 410 where the antenna simulation model from block 402 is used to define a desired dielectric constant for each respective area of the substrate. One example of a substrate material having areas where there are different dielectric constants is presented in FIG. 8. Thereafter the method 400 proceeds towards block 412.

Figure 5:
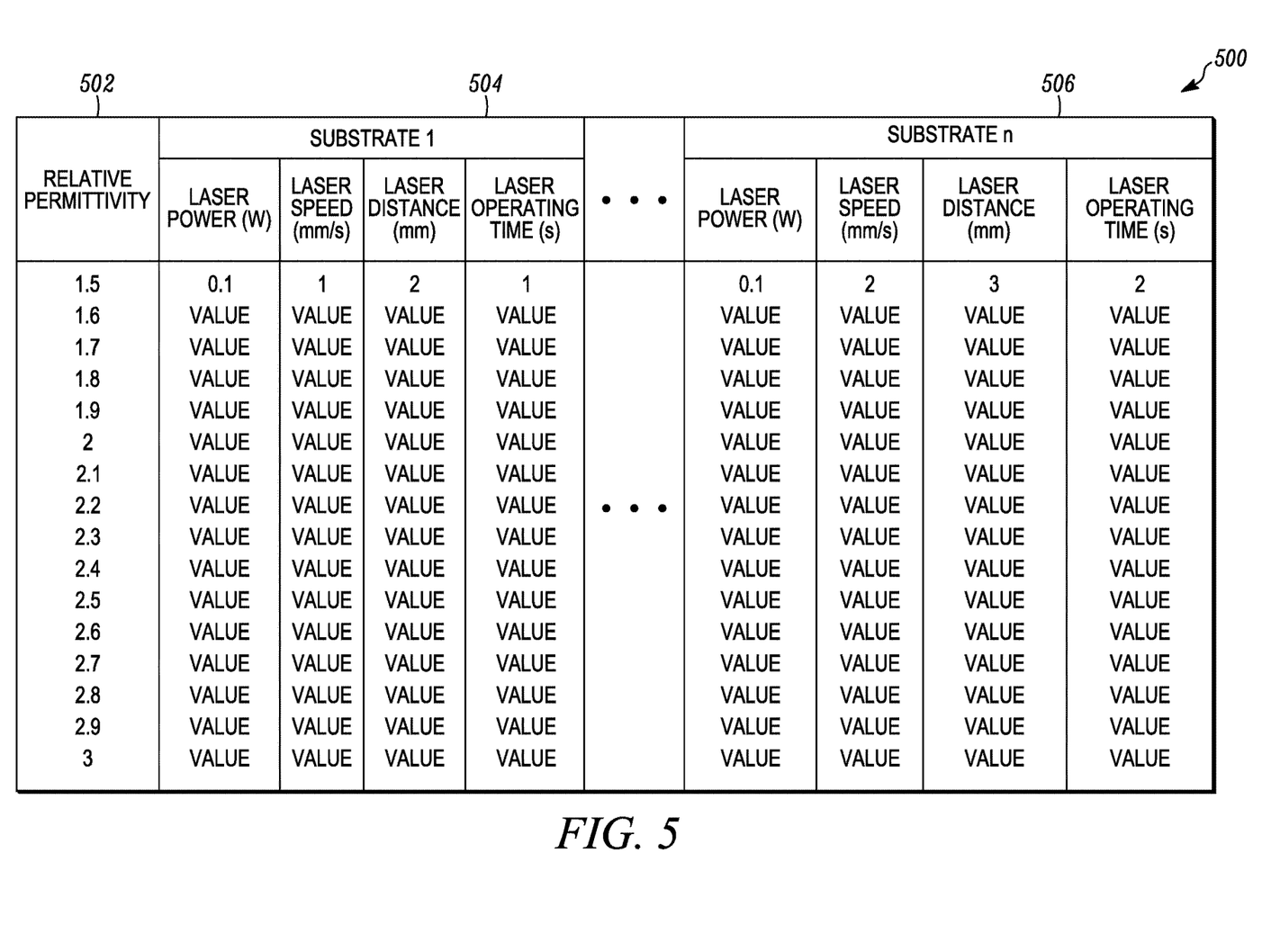
FIG. 5 depicts a look-up table that includes operating parameters for a laser for use in tuning an antenna by laser etching a substrate material of the antenna in accordance with some embodiments.

At block 412, a lookup table, such as depicted in FIG. 5 and stored in memory, can be used to determine the laser operating parameter(s) of the laser and etching time. The lookup table allows the laser to be set to create the desired dielectric constant on the substrate by modulating the appropriate operating parameters of the laser. For example, to increase the dielectric constant by 4 points on a substrate made of LEXAN 1414, the laser can be set at a power level of 100 milliwatts for 2 seconds. However, adjusting other laser operating parameters can be used to achieve similar results. For example, decreasing the power level of the laser below 100 milliwatts for a period of time longer than 2 seconds or increasing the power level of the laser above 100 milliwatts for a period of time shorter than 2 seconds can achieve similar results.

After determining the operating parameters and etching time, the method 400 proceeds towards block 414. At block 414, the method 400 stores in memory the antenna simulation model having the parameters and times for etching the substrate. In an embodiment, the antenna simulation model, parameters, and etching times are used at block 414 to etch the substrate.

FIG. 5 depicts a lookup table 500 that includes operating parameters for a laser in accordance with some embodiments. A computer, such as the computer 102 of the laser etching system 100, stores and accesses information in the lookup table 500. The lookup table 500 includes a relative permittivity column 502 and columns for laser operating parameters for one or more types of substrate materials. Illustratively, FIG. 5 depicts the operating parameters as "laser power," "laser speed," "laser distance," and "laser operating time." However, that illustration is not intended in any way to limit the scope of the material disclosed herein. It is appreciated that the lookup table 500 can include more or less operating parameters. For illustrative purposes only, laser operating parameters for two substrate material types are shown in the lookup table 500 as "SUBSTRATE 1" 504 and "SUBSTRATE n 506."

Implementing embodiments of the present teachings, for instance as described by reference to FIGS. 1 to 5, various antenna structures can be manufactured. For an embodiment, such an antenna structure includes a substrate material having laser etched therein an antenna design. The substrate material is characterized by an intrinsic dielectric constant. The antenna structure also includes a conductive material formed within the antenna design. The substrate material has further laser etched therein a first area that has a dielectric constant different than the intrinsic dielectric constant of the substrate material. The first area tunes a resonant frequency of the antenna structure to within a tolerance range of a desired resonant frequency.

For a particular embodiment of the antenna structure, the first area includes first and second segments each having a different dielectric constant. For another embodiment of the antenna structure, the antenna design and the conductive material are located on a first surface of the substrate material, and the first area is located on a second parallel surface of the substrate material. In yet another embodiment, the conductive material forms first and second antenna elements of an antenna array configured to separately transfer electromagnetic waves. The first segment of the first area is located adjacent to the first antenna element, and the second segment of the first area is located adjacent to the second antenna element.

Figure 6:
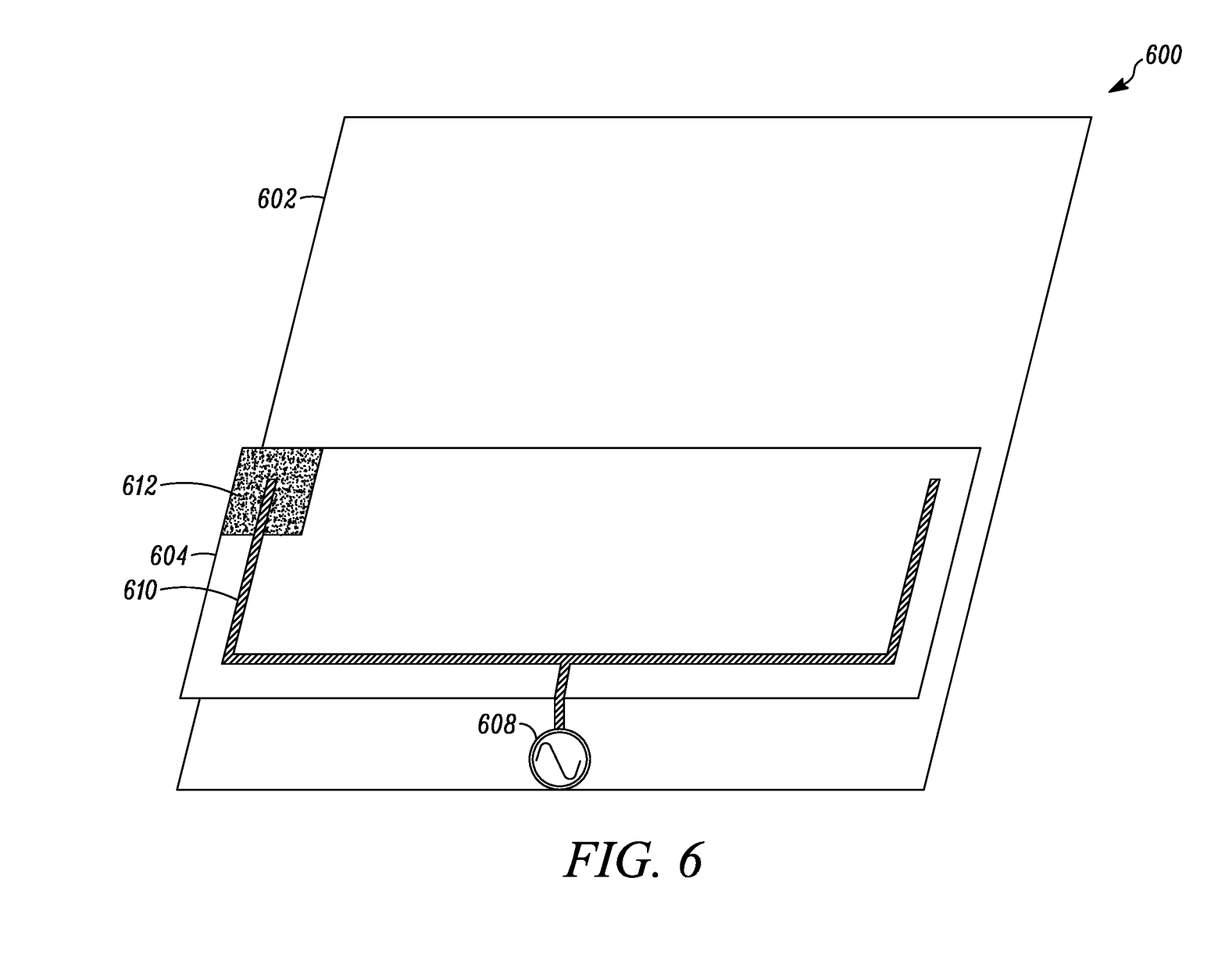
FIG. 6 depicts an antenna tuned by laser etching a substrate material of the antenna in accordance with some embodiments.
Figure 7:
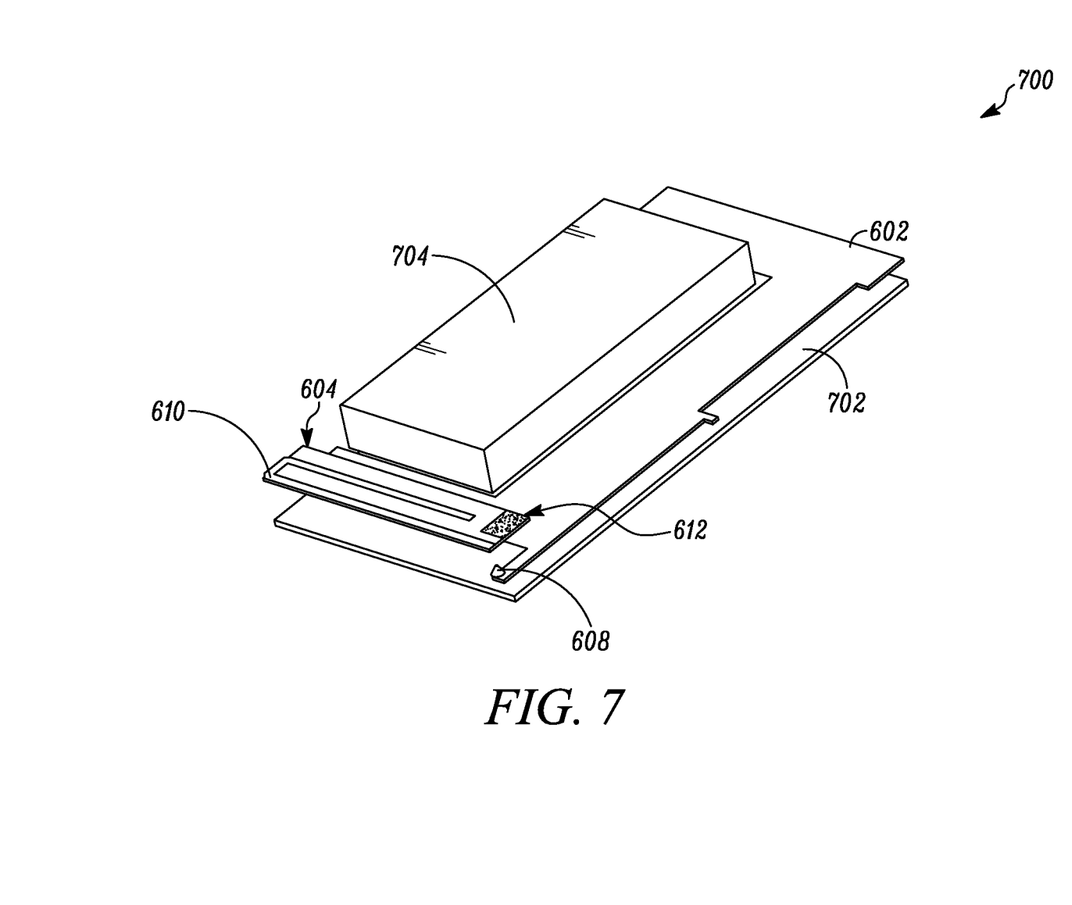
FIG. 7 depicts the tuned antenna in FIG. 6 incorporated within an electronic device, in accordance with some embodiments.
Figure 8:
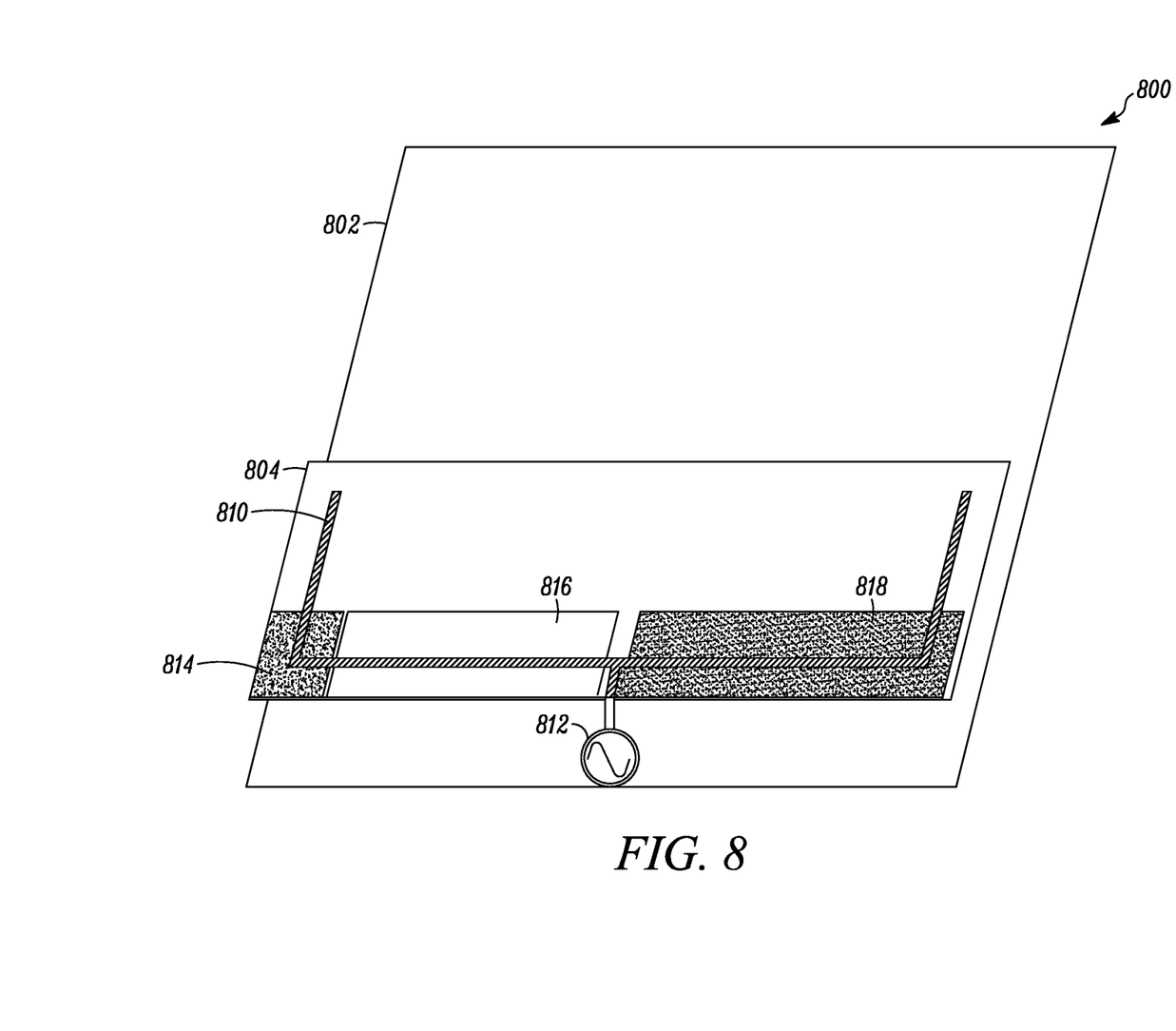
FIG. 8 depicts another antenna tuned by laser etching a substrate material of the antenna in accordance with some embodiments.

FIGS. 6, 7, AND 8 depict examples of antennas that have been fine-tuned to change the dielectric constant of the substrate material and alter the performance of the antenna. FIG. 6 depicts a tuned antenna 600, and FIG. 7 depicts the tuned antenna 600 mounted in a device 700, in accordance with some embodiments. The tuned antenna 600 includes an antenna substrate 604 mounted on a PCB 602. One side of the substrate 604 has been etched for subsequent placement of an antenna element 610 made of conductive material. On the opposite side of the substrate 604, an area 612 of the substrate 604 has been laser etched to change the dielectric constant of the antenna 610 from an original or intrinsic dielectric constant for the substrate material. The antenna includes an antenna feeding port 608.

FIG. 7 depicts the tuned antenna in FIG. 6 secured to an inside of a wireless electronic device 700, in accordance with some embodiments. As illustrated by the location of a screen 702 and a power supply 704 of the electronic device 700, the antenna structure 600 would be located within a housing (not shown) of the device 700. For one embodiment of the antenna structure 600, the substrate material 604 can form a part of an acoustic chamber for an electronic device 700. For another embodiment of the antenna structure 600, the substrate material 604 forms a part of the housing FIG. 8 depicts an antenna 800 tuned by laser etching, in accordance with some embodiments. Specifically, FIG. 8 depicts the tuned antenna 800 as including an antenna substrate 804 mounted on a PCB 802. One side of the substrate 804 has been etched for subsequent placement of an antenna element 810 made of conductive material. On the opposite side of the substrate 804, a first area 814 of the substrate 804 and a second area 818 have been laser etched to change the dielectric constant at the first area 814 and the second area 818. A third area 816 on the substrate 804 has not been laser etched on the opposite side and thereby has the original or intrinsic dielectric constant for the substrate material. Illustratively, first area 814, second area 818, and third area 816 each have a different dielectric constant with respect to each other. The antenna 800 further includes an antenna feeding port 812. In an embodiment, the first area 814, second area 818, and third area 816 are etched on the same side of the substrate that has been etched for the antenna element 810.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any block(s) that may cause any benefit, advantage, or solution to occur or become more pronounced are not to be construed as a critical, required, or essential features or blocks of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of blocks does not include only those blocks but may include other blocks not expressly listed or inherent to such process, method, article, or apparatus. An block proceeded by "comprises . . . a," "has . . . a," "includes . . . a," or "contains . . . a" does not, without more constraints, preclude the existence of additional identical blocks in the process, method, article, or apparatus that comprises, has, includes, contains the block. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., having a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An antenna structure comprising:
   a substrate material having laser etched therein an antenna element design, wherein the substrate material is characterized by an intrinsic dielectric constant; and
   conductive material formed within the antenna element design; and
   wherein the substrate material has further laser etched therein a first area that has a dielectric constant different than the intrinsic dielectric constant of the substrate material, and wherein the first area tunes a resonant frequency of the antenna structure to within a tolerance range of a desired resonant frequency.

2. The antenna structure of claim 1, wherein the antenna element design and the conductive material are located on a first surface of the substrate material, and the first area is located on a second parallel surface of the substrate material.

3. The antenna structure of claim 1, wherein the first area comprises first and second segments each having a different dielectric constant.

4. The antenna structure of claim 3, wherein the conductive material forms first and second antenna elements of an antenna array configured to separately transfer electromagnetic waves, wherein the first segment of the first area is located adjacent to the first antenna element, and the second segment of the first area is located adjacent to the second antenna element.

5. The antenna structure of claim 1, wherein the substrate material forms a part of at least one of a housing or an acoustic chamber for an electronic device.

6. The antenna structure of claim 1, wherein the intrinsic dielectric constant of the substrate material is greater than the dielectric constant of the first area.

7. The antenna structure of claim 3, wherein the intrinsic dielectric constant of the substrate material is greater than the dielectric constants of the first and second segments.

8. The antenna structure of claim 1, wherein the antenna element design and the first area are laser etched using the same laser operating parameters.

9. The antenna structure of claim 1, wherein the substrate material is laser etched by varying a laser operating parameter to change the intrinsic dielectric constant.

10. An antenna structure comprising:
    a substrate material having laser etched therein an antenna element design, wherein the substrate material is characterized by an intrinsic property having a first value; and
    conductive material formed within the antenna element design;
    wherein the substrate material has further laser etched therein a first area that has the intrinsic property having a second value different than the first value, wherein the second value of the first area is tuned to control an electrical characteristic of the antenna structure to within a desired tolerance range.

11. The antenna structure of claim 10, wherein the intrinsic property is a dielectric constant.

12. The antenna structure of claim 11, wherein the electrical characteristic of the antenna structure is a resonant frequency.

13. The antenna structure of claim 12, wherein the first value of the dielectric constant of the substrate material is greater than the second value of the dielectric constant of the first area.

14. The antenna structure of claim 11, wherein the first area comprises:
    a first segment having the dielectric constant with a third value; and
    a second segment having the dielectric constant with a fourth value that is different than the dielectric constant with the third value.

15. The antenna structure of claim 14, wherein the first value of the dielectric constant of the substrate material is greater than both the third and fourth values of the dielectric constant of the first and second segments.

16. The antenna structure of claim 14, further comprising an array of antenna elements, wherein the conductive material comprises:
    a first portion laid adjacent to the first segment of the first area to form a first antenna element of the array configured to transfer electromagnetic waves.

17. The antenna structure of claim 16, wherein the conductive material further comprises:
    a second portion laid adjacent to the second segment of the first area to form a second antenna element of the array configured to transfer electromagnetic waves separately from the first antenna element.

18. The antenna structure of claim 10, wherein the antenna element design and the first area are laser etched using the same laser operating parameters.

19. The antenna structure of claim 10, wherein the substrate material is laser etched by varying a laser operating parameter to change the intrinsic property.

20. The antenna structure of claim 10, wherein the substrate material forms a part of at least one of a housing or an acoustic chamber for an electronic device.

* * * * *